United States Patent [19]

Stift

[11] 4,001,008
[45] Jan. 4, 1977

[54] METHOD AND APPARATUS FOR THE REDUCTION OF ORES, ESPECIALLY IRON ORES

[75] Inventor: Kurt Stift, Leoben, Austria

[73] Assignee: Vereinigte Oesterreichische Eisen- und Stahlwerke - Alpine Montan Aktiengesellschaft, Austria

[22] Filed: Oct. 1, 1975

[21] Appl. No.: 618,675

Related U.S. Application Data

[63] Continuation of Ser. No. 495,184, Aug. 6, 1974, abandoned, which is a continuation of Ser. No. 305,085, Nov. 9, 1972, abandoned, which is a continuation of Ser. No. 90,177, Oct. 8, 1970, abandoned.

[52] U.S. Cl. .................................... 75/11; 75/38; 75/40; 75/48; 75/51
[51] Int. Cl.² ........................................ C21C 5/52
[58] Field of Search ............ 75/11, 42, 38, 40, 48, 75/51

[56] References Cited

UNITED STATES PATENTS

| | | | |
|---|---|---|---|
| 1,934,082 | 11/1933 | Moll et al. | 75/40 |
| 3,151,974 | 10/1964 | Rheinlander | 75/42 |
| 3,236,628 | 2/1966 | Bogdandy | 75/42 |

*Primary Examiner*—M. J. Andrews
*Attorney, Agent, or Firm*—Cushman, Darby & Cushman

[57] ABSTRACT

A method of reducing iron ores in a shaft furnace. The furnace has an enlarged lower portion which is joined to an upper portion by an intermediate portion of reduced cross-sectional area. Iron ores are introduced in the upper portion of the furnace without addition of fuel (such as coke), and hot reducing gases are produced outside the furnace through partial combustion. The hot reducing gases and carbon in powder form are introduced into the lower portion of the furnace in a generally downward direction toward the iron bath in the lower portion of the furnace, and heat produced by electric energy is supplied to the furnace lower portion. Exceptionally accurate control is provided of the amount of carbon to the iron ore is very rapid.

5 Claims, 4 Drawing Figures

METHOD AND APPARATUS FOR THE REDUCTION OF ORES, ESPECIALLY IRON ORES

CROSS-REFERENCE TO RELATED APPLICATIONS

This application is a continuation of application Ser. No. 495,184, filed Aug. 6, 1974 now abandoned, which is a continuation of application Ser. No. 305,085, filed Nov. 9, 1972 now abandoned, which is a continuation of application Ser. No. 90,177, filed Oct. 8, 1970, now abandoned.

BACKGROUND OF THE INVENTION

The reduction of iron ores usually is carried out in a blast furnace whereat iron ore, if desired flux materials, and coke are fed through the blast furnace mouth into the shaft, and air of combustion (blast air) is supplied through the tuyeres down in the hearth. In the classical blast furnace process, the whole energy for melting and reduction is supplied by the coke, and therefore large quantities of coke are needed. Especially in countries without own deposits of cokable coal, this need of coke is disadvantageous. It is already known to cut the need of coke by feeding liquid or gaseous hydrocarbons into the lower shaft portion or into the boshes of the blast furnace, respectively. According to this known method, the hydrocarbons are blown into the blast furnace either through the tuyeres or through separate nozzles. In this connection, it has been suggested that the liquid or gaseous hydrocarbons be supplied to the blast furnace in partially combusted condition whereat CO and $H_2$ resulting from the partial combustion take over part of the reduction work. Thus it is possible to cut the need of coke, but there are still considerable quantities of coke needed for the operation of the blast furnace. Even if the reducing gases are introduced in preheated condition, e.g. at a temperature ranging from 950° C (1742° F) to 1000° C (1832° F), and transfer their heat to the ore, the greater part of the energy for melting and reduction in such a process is still supplied by the coke.

In all processes in which iron ore and coke are fed through the blast furnace mouth whereby the iron ore and the coke in the blast furnace shaft descend in uniflow in proportion to the proceeding of the melting process, the so-called Boudouard reaction takes place, which is a reaction of the oxygen of the carbon dioxide with the carbon of the coke. Thereby, a re-reduction of $CO_2$ takes place at temperatures of above 1000° C (1832° F), and this re-reduction represents a considerable loss.

It is the principal object of the present invention to provide an improved method of reducing iron ores in a shaft furnace by which the above-mentioned disadvantages of the presently known processes are being overcome.

In accordance with one aspect of this invention there is provided a method for the reduction of ores, especially iron ores, in a shaft furnace which includes feeding ore and, if desired, slag-forming or flux materials, without any fuel or coke, respectively, into the upper portion of the shaft furnace, and feeding reducing gases originating from a partial combustion together with their combustion heat and additional heat, and, if desired, solid carbon in powder form, especially soot originating from the partial combustion, into the lower portion of the shaft furnace. It is, therefore, an essential features of the present invention that no fuel be supplied to the burden through the blast furnace mouth, so that upon descent of the burden no carbon is generated and therefore no Boudouard reaction can take place.

According to a further aspect of the invention, said partial combustion is being carried out immediately before introduction of the fuel into the shaft furnace, so that the heat of combustion can be utilized in a simple manner. The partial combustion could, however, also be carried out aside from the shaft furnace, and the heat of combustion be transferred indirectly to the blast furnace process. For increasing the temperature, it is expedient to carry out the partial combustion with preheated blast air. Furthermore, an increase of temperature can be obtained by using oxygen instead of air for the partial combustion, so that there is no nitrogen ballast to be heated.

Fuels which may be used in the partial combustion process are liquid and/or gaseous hydrocarbons and/or solid fuels. Since the heat of the partial combustion process is not sufficient for melting down iron, additional heat is supplied within the range of the zone where the partially combusted gases are being introduced. According to another aspect of the invention, said additional heat is generated by means of electrical energy such as plasma or flaming arcs or tension fields, respectively, within the burners, and/or heat energy is supplied generated by electric arcs or induction. By supplying additional heat, the requirement of heat energy for melting and reduction work and the like can be fulfilled without impairing the necessary reduction work of the introduced gases in any way.

Since no coke or other fuel is being charged through the blast furnace mouth, and as the burden consists only of ore and, if desired, slag-forming or flux materials, any re-reduction (Boudouard reaction) of carbon dioxide which causes losses in known processes is completely avoided. In the process of the present invention, only peheated reducing gases, i.e. carbon monoxide and hydrogen, developed by a partial combustion process, flow toward the descending burden column and effect the reduction. The soot generated as a product of partial combustion is being used for direct reduction and for carburization of the iron bath. By controlling the amount of soot to be developed, the grade of carburization of the iron bath can be set, and thereby a final product may be obtained which is in the range between pig iron and purified steel. The amount of soot to be developed and, as a consequence thereof, the carburization grade of the iron bath, may be controlled in an easy manner by regulating the oxygen supply to the partial combustion process. According to still another aspect of the invention, the partially combusted gases are introduced into the lower portion of the shaft furnace at different heights, if desired containing different amounts of oxygen and having different temperatures. Thereby, the process can be adapted optimally to the required course of temperatures and reductions in the furnace.

The present invention makes possible a blast furnace process without the necessity of using any coke which is of great importance for countries which do not have any, or only small, deposits of cokable coal. Besides, the economy of the blast furnace process is being improved by avoiding the Boudouard reaction, and an essential advantage of the present invention is the possibility of controlling the process at any time. The process is controllable due to the fact that the burden column contains only ore but no coke, and that the supply of reducing gases can be regulated precisely at any time whereat, particularly if additional heat is being supplied by means of electrical energy, the heat supply can be regulated precisely, too.

An apparatus for carrying out the process is characterized by the following important feature of the invention: a shaft furnace having cracking burners in its lower portion (in the present case the term "cracking burner" shall have the meaning that in such a burner the fuel is being combusted only partially to reducing gases). These cracking burners may be regulated for producing the desired reducing gases or soot, respectively. In accordance with another aspect of this invention, these cracking burners are arranged at different heights, whereat it is advantageous if the lower burners primarily generate heat and the upper burners primarily generate reducing gas and soot.

When carrying out the method of the present invention in a blast furnace of the well-known type, only ore and, if desired, slag-forming or flux materials are charged through the blast furnace mouth, while the partially combusted gases are fed into the boshes and-/or into the hearth of the furnace. A blast furnace of the well-known type is, however, calculated for ore and coke to be supplied through the blast furnace mouth, and therefore it seems expedient to construct a special shaft furnace for the purposes of the present invention, wherein the lower portion, where the cracking burners are arranged, is enlarged as compared with the shaft, its cross-sectional area being expediently equal to at least one and a half times, preferably about two to four times, the cross-sectional area of the shaft.

DETAILED DESCRIPTION OF THE INVENTION

Figure 1:
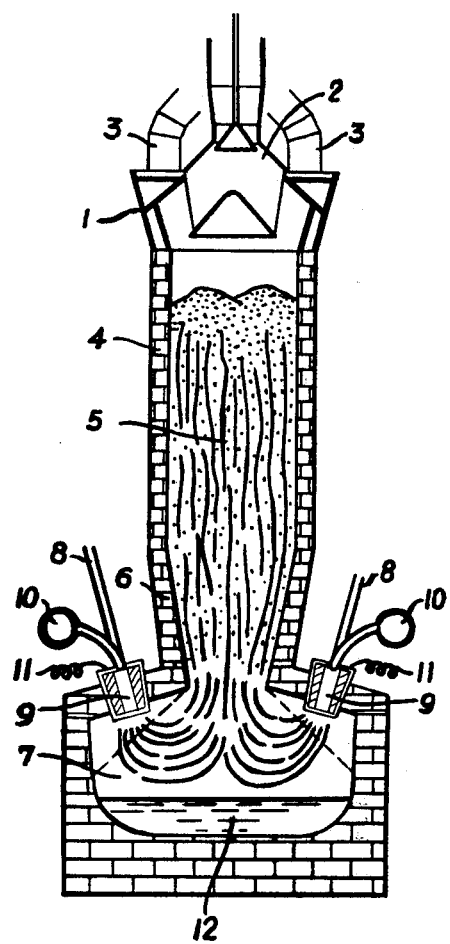
FIGS. 1–3 show exemplary apparatus for practicing the improved method according to the present invention.

The shaft furnace schematically shown in FIG. 1 is to be charged with ore and flux material similar to a usual blast furnace through mouth 1 and a hopper 2. From the top of the furnace there extend waste pipes 3. The iron ore descends into shaft 4 wherein the burden column 5 contains only ore and, if desired, flux material but no coke. Portion 6 of shaft 4 is constricted similarly as the boshes of a usual blast furnace. The lowermost portion 7 is enlarged as compared with shaft 4.

Conduits 8 for feeding oil or other hydrocarbons are connected to cracking burners 9 which are arranged around the shaft. Technically pure oxygen or highly concentrated oxygen and/or preheated blast air is fed to said burners through conduits 10. For generating additional heat, electrical supply lines 11 are provided. The cracking burners 9 may form electrodes themselves, or they may include electrodes, and heat energy may be generated by means of electric flame arcs or plasma.

In the cracking burners 9, carbon monoxide and hydrogen are developed due to incomplete combustion, and these gases flow upwardly through the descending burden column 5 and cause reduction. At the same time, carbon in the form of soot is developed in the cracking burners, which soot causes carburization. Under the supplied heat iron and slag are molten, and an iron bath 12 is formed. As can be readily seen in FIGS. 1–3, according to the present invention the gases with entrained soot are introduced downwardly into the lowermost portion 7 of the furnace through members 9. The reduced gases will flow upwardly into portion 6 of shaft 4, while the soot will enter the bath 12.

Figure 2:
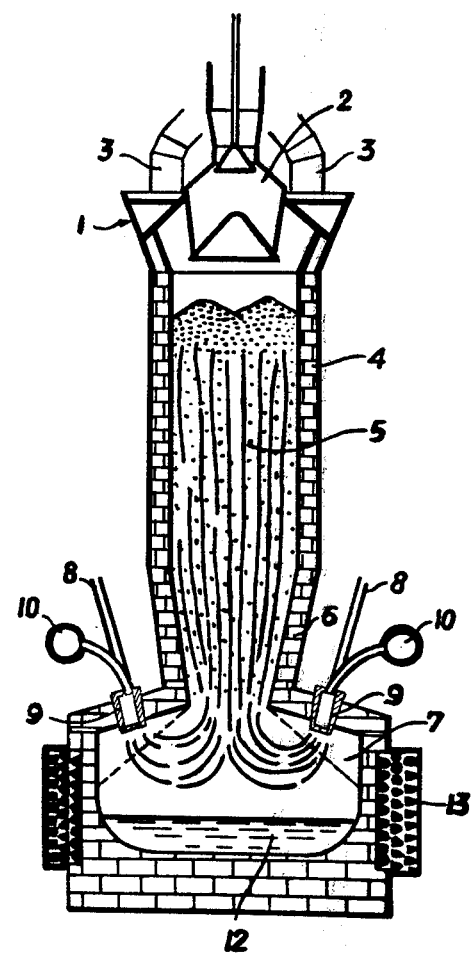

The embodiment shown in FIG. 2 is different from the one of FIG. 1 insofar as an induction coil 13 is provided for generating additional heat.

Figure 3:
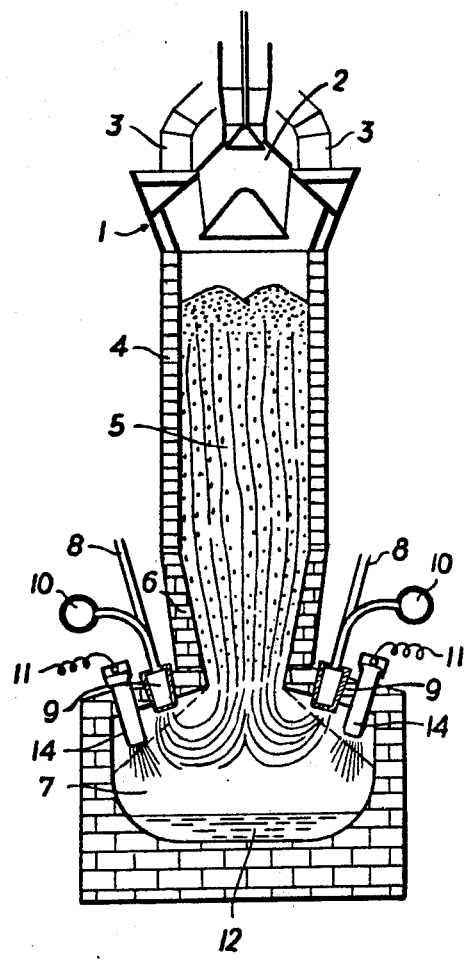

The illustration of FIG. 3 is provided with separate electrodes 14 as compared with the furnace of FIG. 1.

Figure 4:
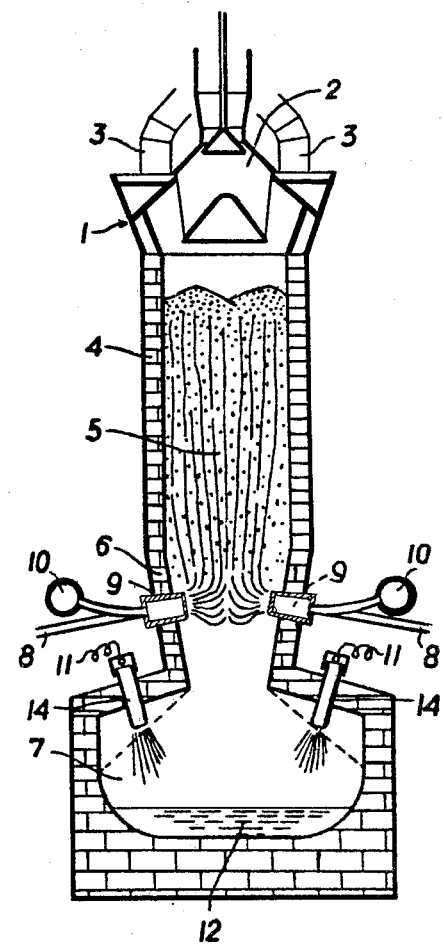
FIG. 4 is another illustration of apparatus for reducing iron ores.

The embodiment of FIG. 4 differs from the one shown in FIG. 3 insofar as the cracking burners 9 are arranged on the constricted shaft portion 6 corresponding to the boshes of a blast furnace. As in the previously mentioned embodiments, oil or other hydrocarbons are fed through conduits 8, and technically pure oxygen with or without preheated blast air are fed through conduits 10 to the cracking burners 9; additional heat is again supplied by electric arcs from electrodes 14.

If in accordance with the method of the present invention fuel-oil is being used and combusted partially, e.g. with air of ambient temperature in a proportion of about 6 Nm³ gas per kg fuel-oil (96 cu. ft gas per lb. fuel-oil), a flame temperature ranging from 750° to 800° C (1382° to 1472° F) is achieved. Partial combustion of the same fuel-oil in the same proportion with technically pure oxygen results in a flame temperature of about 1400° C (2552° F) which could also be reached from partial combustion with preheated air of 1100° to 1200° C (2012° to 2192° F). Under supply of additional heat in the burner by means of electrical energy, e.g. by plasma or flame arc, in the amount of about 1 kWh per kg (0.45 kWh per lb.) fuel-oil, the flame temperature rises to 1700° to 1800° C (3092° to 3272° F), at which temperature iron can be molten from ore easily. The flame temperature can be further increased by increasing the electrical energy supply per weight unit of fuel-oil. Carbon monoxide or hydrogen, respectively, developed from the partial combustion of the fuel, can reduce ferric oxides, particularly in the furnace shaft, in accordance with the general formula:

$$Fe_xO_y + y.CO = x.Fe + y.CO_2$$

or, respectively:

$$Fe_xO_y + y.H_2 = x.Fe + y.H_2O.$$

Remaining ferric oxides may be reduced directly by solid carbon similar to the classical blast furnace process. Carbon developed from partial combustion of the fuel is able to reduce ore directly in the sense of the formula $$FeO + C = Fe + CO$$

and carbon in excess causes carburization of the iron.

By the method of the present invention, similar to a normally operated blast furnace, an essential amount of the ore is being reduced by reducing gases, only in the method of the present invention the percentage is much greater than in the process of a normally operated blast furnace.

While preferred embodiments of the invention have been illustrated and described herein, it will be understood that various variations and changes may be made therein without departing from the principles of the invention or the scope of the annexed claims.

What I claim is:

1. A method of reducing iron ores in a shaft furnace having an upper portion of a given cross-sectional area joined to a lowermost portion of enlarged cross-sectional area, and having an iron bath therein, by an intermediate portion of reduced cross-sectional area, said method comprising the steps of
   a. introducing a descending burden comprising iron ores in the upper portion of the shaft furnace without addition of fuel so that upon descent of the burden no carbon is generated,
   b. producing hot reducing gases through partial combustion of hydrocarbons outside said furnace,
   c. introducing said hot reducing gases and carbon in powder form carried by at least a portion of said hot reducing gases into said lowermost furnace portion in a generally downward direction toward said iron bath said hot reducing gases flow toward the descending burden and effect reduction, and
   d. supplying to the lower portion of said furnace additional heat produced by electric energy.

2. A method as recited in claim 1 wherein said solid carbon is introduced into said furnace lowermost portion in the form of soot obtained in the production of reducing gases through said partial combustion.

3. A method as recited in claim 1 comprising the further step of carrying out said partial combustion with at least one oxidizing gas selected from the group consisting of preheated blast air, technically pure oxygen, and highly concentrated oxygen.

4. A method as recited in claim 1 comprising the further step of controlling the carburization of the iron bath by regulating the oxygen supply to the partial combustion process and thereby regulating the produced amount of soot.

5. A method as recited in claim 1 comprising the further step of feeding slag-forming materials into the shaft furnace together with the iron ore.

* * * * *